US011859726B2

(12) United States Patent
Decker

(10) Patent No.: US 11,859,726 B2
(45) Date of Patent: Jan. 2, 2024

(54) VALVE WITH VARIABLE OPENING

(71) Applicant: TotalEnergies One Tech, Courbevoie (FR)

(72) Inventor: Sébastien Decker, Octeville sur Mer (FR)

(73) Assignee: TOTALENERGIES ONE TECH, Courbevoie (FR)

(*) Notice: Subject to any disclaimer, the term of this patent is extended or adjusted under 35 U.S.C. 154(b) by 0 days.

(21) Appl. No.: 17/786,032

(22) PCT Filed: Dec. 14, 2020

(86) PCT No.: PCT/EP2020/085895
§ 371 (c)(1),
(2) Date: Jun. 16, 2022

(87) PCT Pub. No.: WO2021/122409
PCT Pub. Date: Jun. 24, 2021

(65) Prior Publication Data
US 2023/0028032 A1    Jan. 26, 2023

(30) Foreign Application Priority Data
Dec. 17, 2019  (FR) ..................................... 1914628

(51) Int. Cl.
*F16K 3/08*     (2006.01)
*F16K 3/314*    (2006.01)
(Continued)

(52) U.S. Cl.
CPC .............. *F16K 3/085* (2013.01); *F16K 3/314* (2013.01); *F16K 11/074* (2013.01); *F16K 31/54* (2013.01)

(58) Field of Classification Search
CPC ........ F16K 3/085; F16K 3/314; F16K 11/074; F16K 31/54
(Continued)

(56) References Cited

U.S. PATENT DOCUMENTS 2,878,829 A * 3/1959 Folmsbee .............. F16K 11/074
137/553
2,959,330 A * 11/1960 Charbonneau ....... B67D 1/0083
222/362

(Continued)

FOREIGN PATENT DOCUMENTS

EP    2354607 A1    8/2011
WO   91/06795 A1   5/1991

OTHER PUBLICATIONS

PCT/EP2020/085895 International Search Report and Written Opinion dated Mar. 1, 2021 (8 p.).

*Primary Examiner* — John Bastianelli
(74) *Attorney, Agent, or Firm* — Sughrue Mion, PLLC

(57) ABSTRACT

A valve includes: a tubular pipe section, a first flat plate extending transversely to the pipe section inside the pipe section and secured to the pipe section, this first flat plate being pierced with a central orifice and with a plurality of peripheral orifices positioned circumferentially around the central orifice, a second flat plate extending transversely to the pipe section inside the pipe section and mounted with the ability to rotate inside the pipe section, the second plate having a plurality of orifices of which at least the shape and the spacing correspond to those of the orifices of the first plate, at least one support element supporting the second plate such that the at least one support element can pivot with respect to the first plate, and an adjusting system engaging with the second orifice plate in order to adjust the relative positions of the peripheral orifices.

15 Claims, 3 Drawing Sheets

(51) Int. Cl.
*F16K 11/074* (2006.01)
*F16K 31/54* (2006.01)

(58) Field of Classification Search
USPC .......................................................... 251/301
See application file for complete search history.

(56) References Cited

U.S. PATENT DOCUMENTS

| | | | | |
|---|---|---|---|---|
| 3,080,759 | A * | 3/1963 | McQuaid | G01N 30/20 |
| | | | | 73/863.73 |
| 3,414,007 | A | 12/1968 | De Marco | |
| 4,224,958 | A * | 9/1980 | Kaplan | B29C 48/2554 |
| | | | | 137/340 |
| 4,448,214 | A | 5/1984 | D'Alessio | |
| 4,516,606 | A | 5/1985 | Worley | |
| 6,966,336 | B1 * | 11/2005 | Renzi | G01N 35/1097 |
| | | | | 73/863.73 |
| 2009/0205728 | A1 | 8/2009 | Perez et al. | |
| 2012/0152385 | A1 * | 6/2012 | Ketola | F16K 25/005 |
| | | | | 137/625.46 |

* cited by examiner

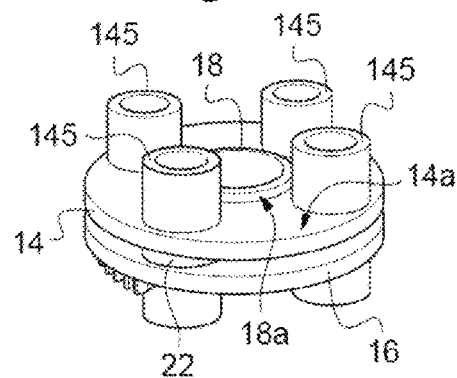
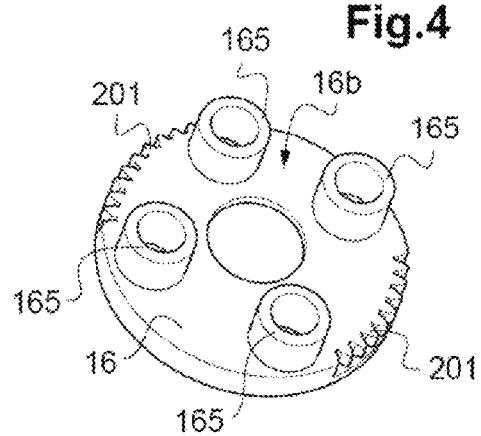
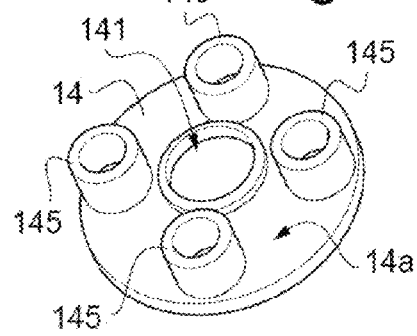

VALVE WITH VARIABLE OPENING

CROSS-REFERENCE TO RELATED APPLICATIONS

This application claims the benefit of PCT/EP2020/085895 filed Dec. 14, 2020, which claims priority from FR1914628 filed Dec. 17, 2019, which is incorporated herein by reference in its entirety for all purposes.

The invention relates to a valve with variable opening for controlling the flow rate and/or the drop in pressure head of a mixture of solids and of fluids such as that present in petrochemical processing equipment, notably catalytic cracking units.

In the petrochemical processes used in refineries, it is often desirable to control the pressure in a processing unit by using variable-opening devices in the form of conventional slide valves or butterfly valves. Sometimes, fixed orifice disks are used in combination with slide valves or butterfly valves to control the pressure in a processing unit or the pressure of a combustion gas conveyed toward equipment downstream.

Use is also made of valves comprising a cylindrical tubular pipe section and a flat plate extending transversely to the pipe section and secured to same, this flat plate being pierced with a central orifice and with a plurality of peripheral orifices arranged around the central orifice. The central orifice is equipped with a pivoting shutter (butterfly valve) to control the rate of the flow passing through it. In service, when these valves are positioned in such a way that the axis of their pipe section is vertical or substantially vertical, the orifices can be fully or partially blocked with debris arriving from the pipeline in which the valve is installed. This may for example be debris from insulating coatings, from erosion-protection coatings and/or from coatings affording protection against attack from corrosive gases, depending on the nature of the circulating fluid. Specifically, this fluid may be a mixture of solids and fluids, the solids potentially leading to erosion and the fluids potentially being corrosive, and the temperature at which these are transported may be very high. This problem of blockage is found in any fixed orifice device.

Document U.S. Pat. No. 4,516,606 describes a disk valve for controlling the flow rate of a mixture of solids and fluids like that present in petrochemical processing equipment. This valve comprises a cylindrical tubular pipe section, a first flat plate extending transversely to the pipe section and secured to same, this first flat plate being pierced with a central orifice and with a plurality of peripheral orifices arranged around the central orifice. The valve comprises a second flat plate extending transversely to the pipe section and having a plurality of orifices of which the size and spacing correspond to the orifices of the first plate. This second plate further comprises a cylindrical tubular support extending through the central opening of the first plate to suspend and mount the second orifice plate such that it can pivot with respect to the first plate and means engaging with a peripheral edge of the second orifice plate in order to rotationally adjust the relative positions of the orifices of the first and second orifice plates.

This type of valve is also prone to blockage of the various orifices present. When the fluid passing through this valve contains solid particles in suspension, these particles can also accumulate in the annular space between its two plates. Specifically, when the pipelines containing this type of valve have a large (1 m and over) diameter, it is very difficult to keep the two plates that make up the valve in intimate contact with one another and the space created between the plates at the peripheral orifices is large enough to allow small-diameter solid particles to enter it. In such instances, the valve may seize, preventing any manipulation and any regulation of the process. Furthermore, when the orifices in the upper plate are not fully aligned with those of the lower plate, the restriction of the passage of the fluid has a geometry that is such that the fluid passing through the variable orifices is deflected away from a "rectilinear" path and may impinge on the walls of the pipeline, leading to accelerated degradation thereof at the site of the impact.

There is therefore a need for a valve with variable opening which is less prone to blockage, particularly as a result of falling debris, and to seizure through the presence of solid particles in the processed fluid passing through it. Likewise, it is necessary to improve the reorientation of the fluid leaving the valve in order to prevent, or at the very least limit, the degradation of the pipeline downstream of such a device.

To this end, a first subject-matter of the invention is a valve with variable opening for controlling the flow rate of a mixture of solids and of fluids such as that present in petrochemical processing, comprising:

a tubular pipe section,
  a first flat plate extending transversely to the pipe section and secured thereto, this first flat plate being pierced with a central orifice and with a plurality of peripheral orifices positioned circumferentially around the central orifice,
  a second flat plate extending transversely to the pipe section and mounted with the ability to rotate inside same, notably with respect to an axis X of the tubular pipe, the second plate having a plurality of orifices, of which at least the shape and the spacing, and possibly also the size, correspond to those of the orifices of the first plate,
  at least one support element supporting the second plate such that it can pivot with respect to the first plate,
  an adjusting system engaging with the second plate in order to adjust the relative positions of the peripheral orifices of the first and second plates by rotating the second plate, notably about an axis perpendicular to the plates.

According to the invention, each peripheral orifice of the first plate is surrounded by a collar secured to the first plate and projecting from a face thereof that is situated on the opposite side to the second plate.

This makes it possible to limit the blocking of the orifices surmounted by a collar with debris dropping onto the first orifice plate. Specifically, this debris bounces off or is deflected by the edge of the collar and drops onto the first plate between the collars.

The valve of the present invention is generally used to control the flow rate of a mixture of solids and fluids like that present in petrochemical processing equipment. Such fluids may lead to significant erosion of the valve or of the pipeline in which it is placed, particularly if the orifices are misaligned, as explained above.

In order to limit the erosion of the valve or of the pipeline as a result of the deflecting of the fluid leaving the second plate, each peripheral orifice of the second plate may be surrounded by a collar secured to the second plate and projecting from a face thereof that is situated on the opposite side to the first plate. Thus, a flow arriving from the first-plate side and leaving via the second-plate side is guided by the collars secured to the latter plate, thus having its direction straightened, and notably guided in a direction perpendicular to the direction of the second plate. These guide collars are thus advantageously designed to guide an outgoing flow in a predetermined direction, preferably parallel to an axis of the tubular pipe section of the valve.

Ideally, to ensure effective straightening of the fluid, the height of the collars may advantageously be greater than or equal to three times the inside passage diameter of the orifices that they surround, and preferably greater than or equal to 5 times the inside passage diameter.

The valve according to the invention may additionally have one or more of the following features:

each collar may be formed of a wall of which the internal surface extends in the continuation of an internal surface of the orifice that it surrounds. Advantageously, each collar may have an internal cross section that is the same shape and the same size as the shape and size of the internal cross section of the orifice that it surrounds.

Each collar may be formed of a wall of which at least the internal surface extends perpendicular to the plate to which it is secured.

For a simple embodiment, each collar may be produced as a single piece with the plate to which it is secured.

Each collar may extend over a height equal to at least three times the inside passage diameter of the peripheral orifice to which it is secured in a direction perpendicular thereto.

Each collar secured to the second plate may extend over a height equal to at least five times the inside diameter of the peripheral orifice to which it is secured, in a direction perpendicular thereto.

The first plate may be provided, on the side of the face thereof that faces toward the second plate, with at least one sealing element surrounding a peripheral orifice of the first plate, each sealing element having a first edge secured to the first plate and an opposite second free edge in sliding contact with the second plate, notably with its face facing the first plate. This may make it possible to limit the ingress of solid particles between the two plates. Advantageously, a sealing-element internal surface closest to the peripheral orifice surrounded extends in the continuation of an internal surface of the orifice surrounded, preferably perpendicular to the first plate. Advantageously, a sealing-element external surface furthest from the peripheral orifice surrounded has a flared shape widening toward the second plate.

A support element may be a tubular support secured to the first plate and may connect, in a fluidtight manner, the central orifice of the first plate to the central orifice of the second plate. The tubular support thus allows the fluid to pass through the plates without accessing the inter-plate space. This arrangement makes it possible to prevent any small-sized solid particles that might be present in the fluid being transported from accessing the inter-plate space and causing the rotation of the second plate to seize.

the peripheral orifices of each plate may be smaller in size than the central orifices.

the peripheral orifices may be arranged equidistantly from one another and/or from the central orifice of the plate of which they form part.

The invention also relates to a vertical or substantially vertical pipeline intended to receive fluid circulating in a top-downward direction of flow, and comprising a valve according to the invention arranged in such a way that the fluid enters via the orifices of the first plate and exits via the orifices of the second plate.

In other words, the invention also relates to the use of a valve according to the invention in a pipeline extending vertically or substantially vertically.

What is meant by a substantially vertical direction is a direction that deviates from a vertical direction by at most 20° or even by at most 10°.

The invention will now be described with reference to the appended non-limiting drawings, in which:

FIG. 1 schematically depicts a view in longitudinal section of a valve according to one embodiment of the invention.

FIG. 2 schematically depicts a view of the valve of FIG. 1, from above.

FIG. 3 depicts a perspective view of the two assembled orifice plates of a valve according to one embodiment of the invention.

FIG. 4 depicts a perspective view, from beneath, of the second orifice plate of FIG. 3.

FIG. 5 depicts a perspective view, from above, of the first orifice plate of FIG. 3.

Figure 1:
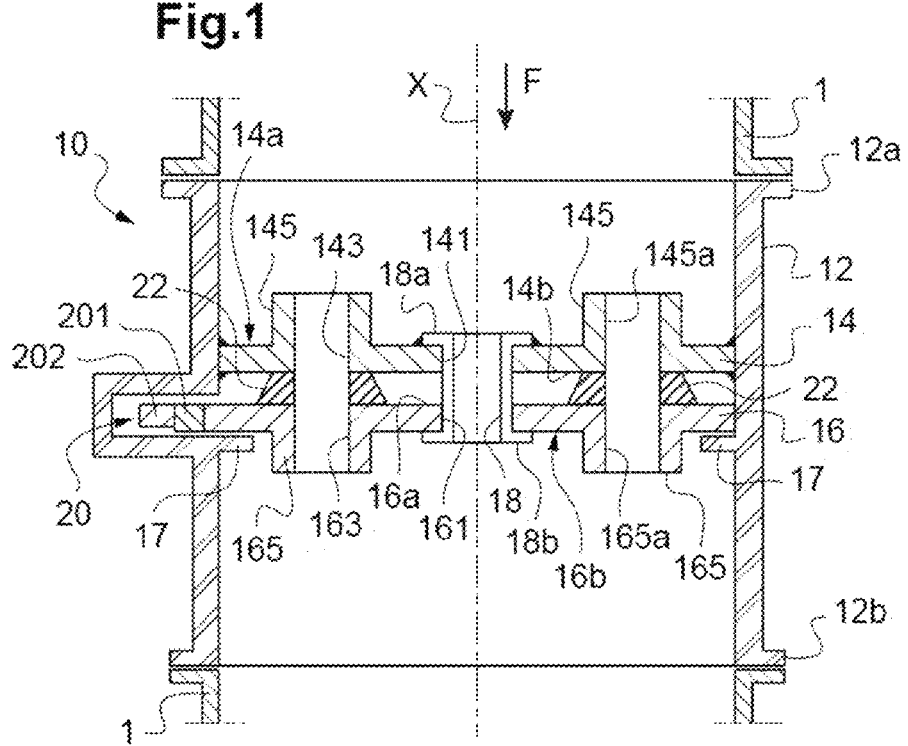
FIG. 1 depicts a variable-opening valve 10 intended to be used for controlling the flow rate of a mixture of solids and of fluids such as that present in petrochemical processing equipment.

The valve 10 comprises a tubular pipe section 12 of axis X intended to be connected to a pipeline 1 in which the valve is to be placed. For this purpose it has, for example, two flanges 12a, 12b at its ends and which can be assembled with similar flanges belonging to the pipeline 1. Alternatively, the tubular pipe section 12 may be butt-welded to the main pipeline in which the valve is to be placed. The fluids circulate through the valve 10 in a direction parallel to the axis X of the pipe section 12, generally from the top downward as depicted symbolically by the arrow F in FIG. 1. Generally, this type of tubular pipe section 12 is cylindrical in shape.

The valve 10 also comprises a first flat plate 14 and a second flat plate 16 which extend transversely to the pipe section 12, namely perpendicular to the axis X of the pipe section 12, inside same. The second plate 16 is mounted with the ability to rotate about the axis X of the pipe section 12. Usually, these two plates have the same shape and size.

Figure 2:
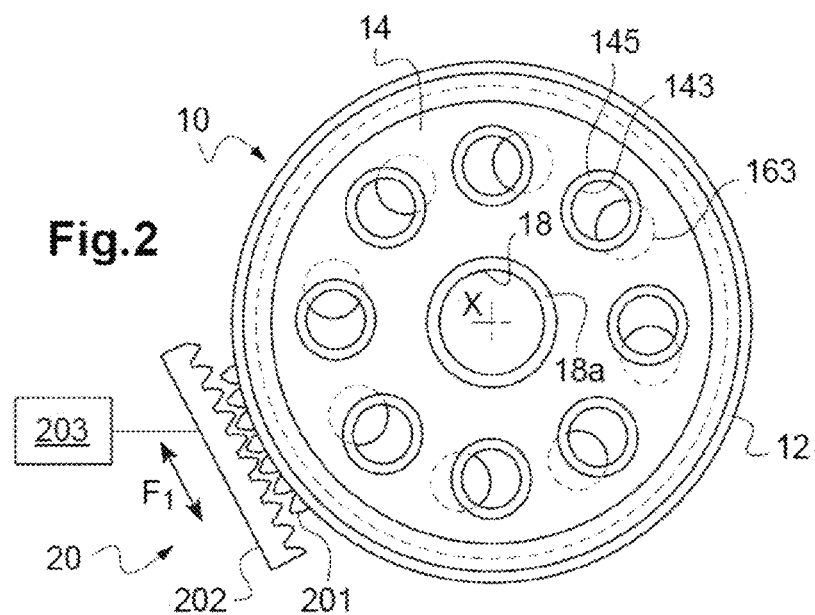

Each plate 14, 16 is pierced with a respective central orifice 141, 161, and with a respective plurality of peripheral orifices 143, 163, which are arranged circumferentially around the central orifice 141, 161. The various orifices of each of the first and second plates correspond to one another at least in terms of shape and spacing, preferably in terms of size, shape and spacing, so that when the two plates 14, 16 are positioned one above the other, the centers of their central orifice coincide, and a rotation of the two plates with respect to an axis passing through these centers allows greater or lesser super positioning of the peripheral orifices, as depicted in FIG. 2. In other words, the positions and shapes, and advantageously also the size, of the various orifices of each of the first and second plates are such that these orifices correspond with one another, namely are aligned in a position perpendicular to the plates, in at least one relative position of these plates. Thus, adjusting the relative position of the two plates by rotation about the axis X passing through the centers of the central orifices 141, 161 allows the cross section for the passage of the fluids through the peripheral orifices 143, 163 to be modified and regulated.

In the example, the peripheral orifices are smaller in size than the central orifices. The peripheral orifices are preferably arranged equidistantly from one another and from the central orifice that they surround.

At least one support element supports the second plate 16 such that it can pivot with respect to the first plate 14.

Thus it is possible to provide a support element 17 secured to the internal wall of the pipe section 12 and extending over the entire periphery thereof, this support element 17 defining an annular surface on which the second plate 16 can rest (FIG. 1). Note that several support elements 17 secured to the internal wall of the pipe section 12 may be provided.

It is also possible to provide, in addition to the support element or elements 17, or in place thereof, a support element of tubular shape 18, secured to the first plate 14 and which connects, in a fluidtight manner, the central orifice 141 of the first plate to the central orifice 161 of the second plate, as depicted in the example, so as to prevent solid particles contained in the fluid passing through the valve from gaining access via the central orifice to the gap between the two plates.

This tubular support 18 may be fixed in fluidtight manner to the first plate 14 by any suitable means, for example by welding if the two components are made of metal, or by riveting, screw-fastening, etc.

In the example, the tubular support 18 has an upper flange 18a resting on the face 14a of the first plate 14 and welded thereto (FIG. 1). The tubular support 18 at its other end has a lower flange 18b holding the second plate 16 which is thus mounted with the ability to pivot on the tubular support 18. Of course the invention is not restricted to this arrangement, it being possible for example for the tubular support 18 to be fixed to the face 14b of the first plate around the central orifice thereof. The tubular support 18 may even be produced as one piece with the first plate, for example in the continuation of the central orifice thereof and may pass through the second plate. The second plate may be mounted on the tubular support by means of any other means or support that allows rotation (bearing, support lug, etc.).

The valve 10 further comprises an adjusting system 20 engaging with the second plate 16 in order to adjust the relative positions of the peripheral orifices 143, 163 of the first and second plates by rotating the second plate, in this instance about the axis X of the pipe section 12.

Figure 6:
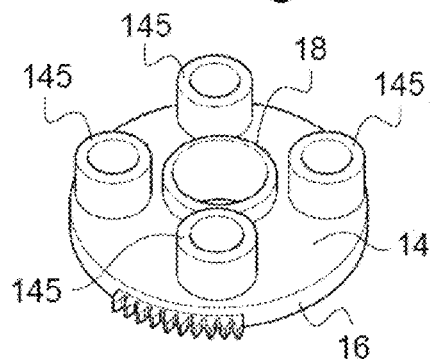
FIG. 6 depicts a perspective view of the superposed two orifice plates of a valve according to another embodiment of the invention.

In the example depicted in FIGS. 1, 2 and 6, this adjusting system 20 comprises a toothed sector 201 secured to the periphery of the second plate 16 and engaging with the teeth of a rack 202 mounted with the ability to slide in translation in the direction of the arrow F1 of FIG. 2. The movement of this rack may be instigated by a movement member 203 such as a stepping motor, a system of hydraulic rams, or any other suitable member. In the example of FIGS. 2 and 6, the toothed sector 201 projects from the periphery of the second plate 16. It is possible for this toothed sector not to project from the periphery of the second plate 16, as in the example of FIG. 4, where the toothed sectors 201 are secured to the face 16b of the second plate. In the variants depicted in FIGS. 3 and 4, one or two toothed sectors 201 are secured to the face 16b of the second plate. The two toothed sectors 201 may therefore be positioned at diametrically opposing locations of the second plate, as depicted in FIG. 4. The invention is not restricted to any one particular form of adjusting system, provided that it allows the second plate to be pivoted with respect to the first plate.

According to the invention, each peripheral orifice 143 of the first plate 14 is surrounded by a collar 145 secured to the first plate 14 and projecting from a face 14a thereof that is situated on the opposite side to the second plate 16. In the example, each collar 145 is produced as a single piece with the plate 14. It will be noted that, in addition, each collar 145 is formed of a wall which has an internal cross section the same shape and size as the shape and size of the internal cross section of the peripheral orifice 143 that it surrounds. These internal cross sections are, in this instance, cross sections of planes perpendicular to the axis X of the pipe section. In other words, the internal surface 145a of each collar 145 extends in the continuation (as a continuous extension) of an internal surface of the peripheral orifice 143. This makes it possible to avoid inducing additional disturbance in the flow of fluid passing through the valve and to avoid erosion by the solid particles contained in the fluid at the junction between the orifice and the associated collar.

Each collar 145 here extends in a direction perpendicular to the first plate 14, or in other words parallel to the axis X of the pipe section 12, over a predetermined height. This height is, for example, at least three times the inside passage diameter of the peripheral orifices and advantageously at most equal to the distance separating one end of the pipe section 12 (corresponding in the example to the flange 12a) from the face 14a of the first plate 14. When these orifices are not cylindrical, the height of the collars may be determined from an imaginary inside diameter calculated for an imaginary circular internal passage section having the same cross-sectional area as the inside passage cross section of the orifice.

The invention is not restricted to the example depicted, and in particular each collar 145 could be fixed to the first plate by any appropriate means, for example by welding, screw-fastening, rivets. Furthermore, the internal surface 145a of each collar here extends parallel to the axis X of the pipe section 12. Although this configuration is preferable, notably so as not to disrupt the flow passing through the peripheral orifices, configurations in which the collars have a flared, for example conical, shape are conceivable. Collars having a parallelepipedal internal cross section are also acceptable, although non-preferred.

In the example depicted, each peripheral orifice 163 of the second orifice plate 16 is also surrounded by a collar 165 secured to the second orifice plate and projecting from a face 16b thereof that is situated on the opposite side to the first orifice plate 14.

As with the first plate 14, in the example, each collar 165 is produced as a single piece with the plate 16. Each collar 165 also has an internal cross section that is the same shape and the same size as the shape and size of the internal cross section of the peripheral orifice 163 that it surrounds. In other words, the internal surface 165a of each collar 165 extends in the continuation (as a continuous extension) of the internal surface of the peripheral orifice 163. Each collar 165 here also extends in a direction perpendicular to the second plate 16, or in other words parallel to the axis X of the pipe section 12, over a predetermined height. This height is, for example, at least three times the inside passage diameter of the peripheral orifices, preferably at least five times the passage diameter of the peripheral orifices, and advantageously at most equal to the distance separating one end of the pipe section 12 (corresponding in the example to the flange 12b) from the face 16b of the second plate 16. When these orifices are not cylindrical, the height of the collars may be determined from an imaginary inside diameter as defined hereinabove.

Similarly, the invention is not restricted to the example depicted, and in particular each collar 165 could be fixed to the second plate by any appropriate means, for example by welding, screw-fastening, rivets. Furthermore, the internal wall 165a of each collar here extends parallel to the axis X of the pipe section 12. Although this configuration is preferable, notably so as not to disrupt the flow passing through the peripheral orifices, configurations in which the collars have a flared, for example conical, shape are conceivable. However, it is preferable for the internal wall 165a of the collars 165 to be oriented in such a way as to direct a flow passing through these collars parallel to the axis X, possibly with a tolerance of at most 5% on the deviation from this axis.

In the example depicted, the first plate 14 is furthermore provided, on the side of its face 14b that faces toward the second plate 16, with a plurality of sealing elements 22-25 surrounding each one of the peripheral orifices 143 of the first plate 14. These sealing elements 22-25 ensure sealing between the two plates, at the site of the peripheral orifices of the valve.

These sealing elements 22-25 are advantageously made of metal.

Figure 7:
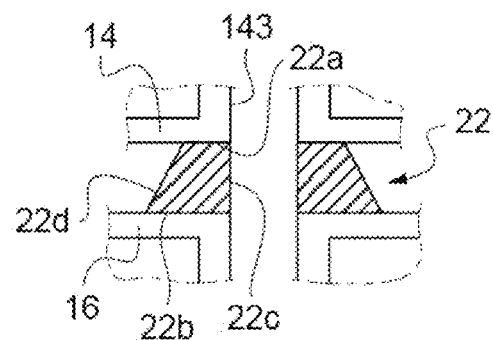
FIG. 7 depicts a view in axial section of a sealing element according to one embodiment.
Figure 8:
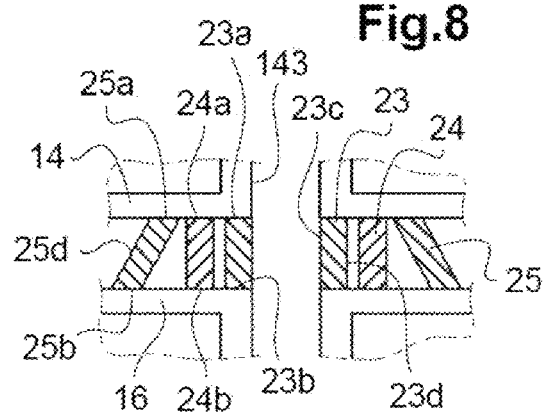
FIG. 8 depicts a view in axial section of sealing elements according to another embodiment.

One or more sealing elements may surround each peripheral orifice. In the example, a single sealing element 22 (FIGS. 1, 7) or three sealing elements 23, 24, 25 (FIG. 8) may be provided.

Each sealing element 22, 23, 24, 25 has a first edge 22a, 23a, 24a, 25a secured to the first plate 14 (to the face 14b thereof) and an opposite free second edge 22b, 23b, 24b, 25b in sliding contact with the second plate 16. Such sliding contact is defined in such a way as not to allow any particles that might be present in the fluid to enter the inter-plate space and to allow the sealing element or elements to slide over the second plate. Thus, when the second plate pivots with respect to the first plate, these sealing elements 22-25 scrape the face 16a of the second plate which is situated facing the first plate 14 thereby preventing particles that may have fallen onto this face 16a, for example when the peripheral orifices of the two plates do not exactly coincide, from slipping in between the plates 14, 16.

When just a single sealing element 22 is provided, the internal surface 22c thereof extends in the continuation (as a continuous extension) of the internal surface of the orifice 143 surrounded, and preferably perpendicular to the plates. Here, this internal surface 22c has an internal cross section the same shape and size as the internal cross section of the peripheral orifice around which the sealing element is placed. The external surface 22d is then preferably of a flared, in this instance frustoconical, shape widening toward the second plate.

When several sealing elements 23, 24, 25 are provided, the sealing element 23 closest to the peripheral orifice surrounded has an internal surface 23c extending in the continuation (as a continuous extension) of the internal surface of the orifice surrounded, preferably perpendicular to the plates. Here, this internal surface 23c has an internal cross section the same shape and size as the internal cross section of the peripheral orifice around which the sealing element is placed. The external surface 23d of the sealing element 23 may then have a shape similar to that of the internal surface 23c.

The sealing element 25 furthest from the peripheral orifice may then have an external surface 25d of flared shape widening toward the second plate. Its internal surface 25c here is of a shape similar to that of the internal surface 23c and of the external surface 23d.

It is possible to provide only the two sealing elements 23 and 25 described hereinabove or to provide one or more intermediate sealing elements (just one, 24, in the example) of similar shape to the sealing element closest to the peripheral orifice.

However, the geometry of the sealing element or elements 22-25 is not restricted to these examples. In particular, the sealing-element external surface furthest from the peripheral orifice may be perpendicular to the first plate.

It will be noted that, in the example depicted, the peripheral orifices of the first and second plates are all of cylindrical shape. However, the invention is not restricted to one particular shape of peripheral orifices, which may have an oblong shape, a polygonal, for example quadrilateral (rectangular, trapezoidal) shape, a circular arc shape, or some other shape. Similarly, the shape of the central orifices may be a shape other than cylindrical.

The valve according to the invention is particularly well suited to use in a refinery unit such as a catalytic cracking unit. This type of valve is therefore placed in pipelines of appreciable (of the order of 1 meter) diameter. The various elements of the valve are therefore made of steel, preferably stainless steel, and possibly covered with a coating protecting them against erosion. The number of peripheral orifices is dependent on the dimensions of the valve and on the fluid flow rate considered. For the above-mentioned use, up to 10 or 12 orifices may be envisioned.

The valve according to the invention could also be used in any application in which debris carried by the fluid is liable to plug the variable-section orifices (the peripheral orifices).

The invention claimed is:

1. A valve with variable opening for controlling the flow rate of a mixture of solids and of fluids present in petroleum processing equipment, comprising:
    a tubular pipe section,
    a first flat plate extending transversely to the pipe section inside the pipe section and secured to the pipe section, this first flat plate being pierced with a central orifice and with a plurality of peripheral orifices positioned circumferentially around the central orifice,
    a second flat plate extending transversely to the pipe section inside the pipe section and mounted with the ability to rotate inside the pipe section, the second plate having a plurality of orifices of which at least the shape and the spacing correspond to those of the orifices of the first plate,
    at least one support element supporting the second plate such that the at least one support element can pivot with respect to the first plate, and
    an adjusting system engaging with the second orifice plate in order to adjust the relative positions of the peripheral orifices of the first and second plates by rotating the second plate,
    wherein each peripheral orifice of the first plate is surrounded by a collar secured to the first plate and projecting from a face thereof that is situated on the opposite side to the second plate.

2. The valve according to claim 1, wherein each peripheral orifice of the second plate is surrounded by a collar secured to the second plate and projecting from a face thereof that is situated on the opposite side to the first orifice plate.

3. The valve according to claim 1, wherein each collar is formed of a wall of which the internal surface extends in the continuation of an internal surface of the orifice that the collar surrounds.

4. The valve according to claim 1, wherein each collar is formed of a wall of which at least the internal surface extends perpendicular to the plate to which the collar is secured.

5. The valve according to claim 1, wherein each collar is produced as a single piece with the plate to which the collar is secured.

6. The valve according to claim 1, wherein each collar extends over a height equal to at least three times the inside diameter of the peripheral orifice to which the collar is secured in a direction perpendicular thereto.

7. The valve according to claim 2, wherein each collar secured to the second plate extends over a height equal to at least five times the inside diameter of the peripheral orifice to which the collar is secured, in a direction perpendicular thereto.

8. The valve according to claim 1, wherein the first orifice plate is provided, on the side of the face thereof that faces toward the second orifice plate, with at least one sealing element surrounding each of the peripheral orifices of the first plate, each sealing element having a first edge secured to the first orifice plate and an opposite second free edge in sliding contact with the second plate.

9. The valve according to claim 8, wherein a sealing-element internal surface closest to the peripheral orifice surrounded extends in the continuation of an internal surface of the orifice surrounded.

10. The valve according to claim 8, wherein a sealing-element external surface furthest from the peripheral orifice surrounded has a flared shape widening toward the second plate.

11. The valve according to claim 8, wherein the sealing-element closest to the peripheral orifice surrounded extends perpendicular to the first plate.

12. The valve according to claim 1, wherein the at least one support element is a tubular support secured to the first plate and connecting, in a fluidtight manner, the central orifice of the first plate to a central orifice of the second plate.

13. The valve according to claim 1, wherein the peripheral orifices of each plate are smaller in size than the central orifices.

14. The valve according to claim 1, wherein the peripheral orifices are arranged equidistantly from one another and/or from the central orifice of the plate of which the peripheral orifices form part.

15. A vertical or substantially vertical pipeline intended to receive fluid circulating in a top-downward direction of flow, comprising a valve according to claim 1 arranged in such a way that the fluid enters via the orifices of the first plate and exits via the orifices of the second plate.

* * * * *